3,385,494
SCRAP MELTING
Nickolas J. Themelis, Beaconsfield, Quebec, Canada, and Leonard E. Olds, Grand Island, N.Y., and Murray C. Udy, deceased, late of Niagara Falls, N.Y., by Mary S. Udy, executrix, Niagara Falls, N.Y., assignors to Strategic Material Corp., Niagara Falls, N.Y., a corporation of New York
Filed Sept. 15, 1966, Ser. No. 579,790
10 Claims. (Cl. 75—10)

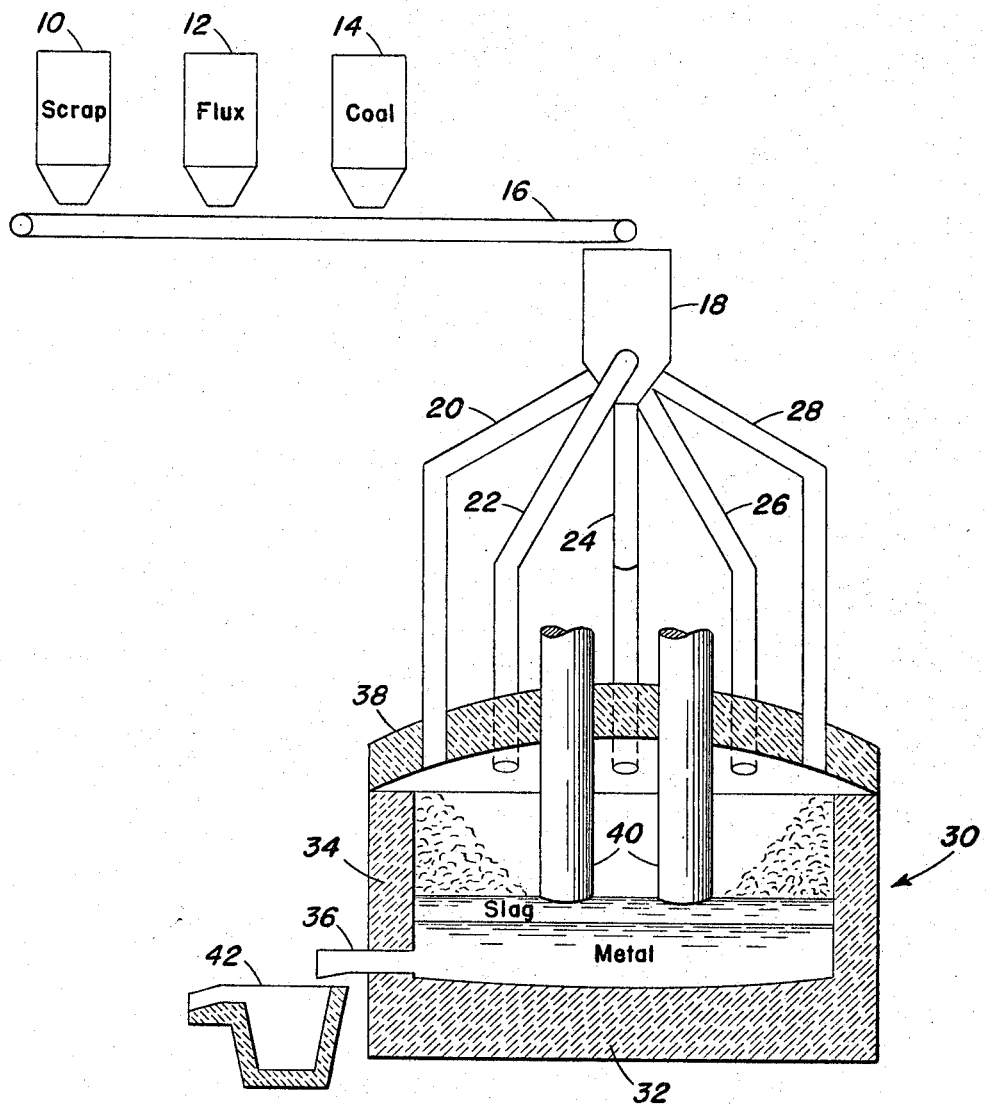

ABSTRACT OF THE DISCLOSURE

Finely divided scrap and sponge materials are difficult to melt, because of the tendency to oxidize. In this process, an electric furnace is used with a thin slag layer, and the electrodes are adjusted for slag resistance heating with little or no arcing. The metal scrap is evenly banked around the side of the furnace, floating on the slag, and heat from the slag melts the metal quickly and efficiently. The metal passes through the slag and forms a molten pool thereunder.

---

This invention relates generally to the melting of scrap metals and, more particularly the invention relates to the melting of finely divided, readily oxidizable, free-flowing scrap material. The method of the invention has particular application to the melting and recovery of iron-bearing scrap such as grindings, turnings, cutting and the like, but may be advantageously applied to any ferrous metallics that are or can be rendered into a free flowing state in the solid phase.

The present-day secondary metals industry performs two essential functions, firstly in recovering scrap that is necessarily generated during metal production and fabrication, and secondly in recovering values from scrapped consumer products. In the latter category, it is often necessary to initially separate non-metallics, after which the metal is melted and refined into heavy melting stock, which is either used directly, combined with primary pigs or shipped to a primary producer. In the case of prime scrap generated by the primary metal producer or fabricator, a substantial proportion of this is handled in-plant, i.e., by recycling to the refining stage. This is possible since compositional variants are minimal and/or are easily controlled.

While the market for ferrous scrap materials is subject to broad fluctuations depending on a variety of economic factors within the steel industry, the relative value of various types of scrap remains relatively constant. Thus, the price for No. 1 heavy melting steel scrap was recently quoted in the $25–29 per ton range, whereas the same material in the form of short shoveling turnings was quoted at $15–18 per ton. Similarly, 18–8 stainless in solid bundles was quoted at $210–215 per ton, whereas 18–8 short shoveling turnings were quoted $105–110 (short shoveling turnings are turnings which have been shredded so as to be handleable with a shovel). The reason for this 100% difference in price for materials of the same composition is the relative difficulty in handling finely divided scrap in a conventional scrap melting operation or other scrap consuming process. The main problem in recovering any finely-divided scrap is that it oxidizes very readily. As a result, it is difficult to store for extended periods and it is difficult to melt. Commonly, a melter will charge an arc furnace with heavy scrap and, if desired, pig iron, melt this down under an appropriate slag, and then charge finely divided materials so that they melt as fast as possible. This minimizes the time for oxidation, which is caused mainly by arc heating.

There are a variety of other metallic materials available today which, while not ordinarily considered as commercial scrap, present similar problems to the melter. The existence of these problems has prevented any significant marketing or usage of these materials. Thousands of tons of grindings are produced in steel plants every year as a result of finishing operations on billets. These grindings have an even higher surface-to-volume ratio than turnings and thus oxidize even more readily. They also suffer from additional disadvantages in that they contain minor percentages of silica and alumina or other impurities picked up from the grinding wheels, they may be partially oxidized by heat generated during the grinding operation itself, and they are usually collected without regard to the composition. The latter fact makes it most difficult to get an accurate analysis of the grindings by grab sampling techniques, and this of course severely limits their utility to a melter, since use thereof in any quantity can throw a heat off-grade. When grindings of the type described have the consistency of steel wool, they are referred to generally in the trade as "swarf." This swarf is not itself free-flowing but, like turnings, can be rendered so by chopping, shredding, etc. Other free-flowing metallics with high surface-to-volume ratios include iron powders and so-called sponge iron produced by a variety of relatively recently developed processes. Sponge iron pellets are quite porous and, hence, oxidizable. Usage thereof by melters has been limited because of the same reoxidation, handling and storage problems associated with finely divided scrap.

It is therefore a general object of the present invention to provide an improved process for melting free-flowing metallics.

Another object of the present invention is to provide an essentially continuous process for melting free-flowing metallics wherein oxidation of the charge is substantially eliminated.

A further object of the invention is to provide a melting process in which 100% of the charge (exclusive of fluxes, etc.) is composed of metallics having a high surface-to-volume ratio.

Yet another object of the invention is to provide a melting process for the exclusive treatment of free-flowing metallics having a high surface-to-volume ratio.

Another object of the invention is to provide a process for economically producing heavy melting stock from finely divided metallics.

A still further object of the invention is to provide a melting process for producing a crude molten iron or stainless alloy from finely-divided metallics which may be finished to a specification product in the same furnace.

Various other objects and advantages of the invention will become clear from the following detailed discussion of several embodiments thereof, and the novel features will be particularly pointed out in connection with the appended claims.

In essence, the present invention comprises the continuous charging of the free-flowing metallic materials, with essential fluxes and some carbon, into an electric arc furnace having electrodes positioned for slag-resistance heating, i.e. with the electrodes actually penetrating into the slag layer with little or no actual arcing. The charge is preferably placed around the edges of the furnace adjacent to the furnace wall, with little or none of the charge actually coming in contact with the electrodes. The charge is fed in at such a rate so that it does not reach the zone of the electrodes, taking into account the natural angle of repose thereof when banked against the wall of the furnace. By keeping the electrode tips essentially immersed in the slag layer, arcing is minimized and arc heating of the charge, the principal cause of reoxidation in conventional melting operations, is substantially eliminated. It is, however, difficult to entirely suppress arcing under normal operating conditions, due primarily to the tendency of the so-called arc pressure to depress the slag immediately under the electrode tips. For this reason, it is prefered to have the furnace walls more or less covered with charge material.

Under these circumstances the mode of heat generation is, as much as possible, through the electrical resistance of the slag. The slag layer may in fact be considered as a direct heat transfer fluid through which the charge passes as it melts. Optimum operation of the electric furnace in accordance with the invention requires that the power input to the electrodes be balanced with the load in the furnace. From this, it follows that charging around the periphery of the furnace should be maintained as evenly and as constant as possible, since the more constant the power loading, the more efficient the melting is.

While a slag layer is necessary to act as a heat transfer fluid, as noted above, it also collects any metal oxides and impurities in the charge. In the melting of swarf, this is particularly important since, in a typical operation, such grindings will contain about 1% $SiO_2$ and about 3% $Al_2O_3$. Burnt lime in the slag avoids oxidation and gas evolution in the furnace, and by keeping alumina in the slag below 20%, foaming is avoided. In the melting of metallics not having such impurities, the slag-to-metal ratio is preferably in the area of 0.1, but with as much as 3% $Al_2O_3$ in the charge the ratio should be closer to 0.2. A small quantity of carbon in the slag keeps it reducing in character and protects the metal from the oxidation.

Understanding of the invention will be facilitated by referring to the accompanying drawing, which is a greatly simplified, partially schematic and partially cross-sectional view of a furnace installation set up for operation in accordance with the invention.

With reference to the drawing, scrap, fluxes and coal are supplied from storage bins 10, 12 and 14, respectively, onto a continuous conveyor 16. It will be understood that the scrap or other metallics charge, while free flowing, may require some other handling equipment than that illustrated. Conveyor 16 discharges the proportioned charge mix into a charge distributor 18, which is provided with a suitable rotating blade or scoop (not shown) so that the charge mixture is evenly distributed into a plurality of charge chutes 20, 22, 24, 26, 28. Those familiar with electric arc furnaces will appreciate that achieving gravity flow of charge into a large number of chutes evenly distributed around the periphery of the furnace will be complicated by the electrode supporting and positioning mechanism (not shown) and it will be understood that two or more charge distributors 18 may be provided. Alternatively, entirely different means may be employed to distribute the charge (screw conveyors, etc.). As noted hereinabove, the efficiency of melting increases with evenness of load; this is the important feature.

The charge mixture drops through chutes 20–28 into the furnace proper, indicated generally at 30. As shown, furnace 30 is provided with a refractory-lined hearth 32 and sidewalls 34, a tap hole 36 and an arched, refractory-lined roof 38 having openings therein for chutes 20–28 and the three electrodes 40 (two shown). While the use of three electrodes in a delta arrangement is now practically standard in the arc-electric furnace industry it will be understood that other arrangements may be employed. For example, a single electrode may be employed with a partially or fully graphite-lined hearth and/or sidewall. Such an arrangement will have certain advantages in terms of a desirable current path for slag resistance heating.

As illustrated in the drawing, the charge mixture passes from chutes 20–28 and comes to rest on the slag layer, the natural angle of repose of the charge being taken into account so that little if any charge is in the immediate vicinity of the electrodes. Periodically, as the furnace approaches capacity, the furnace is tapped into ladle 42. With some raw materials it is possible to discontinue charging of fluxes after a suitable slag layer is established and periodically tap metal while leaving the slag in the furnace. Where there are significant quantities of slag formers in the charge, however, it is necessary to tap both slag and metal. It will be understood that deslagging may be accomplished either in the furnace (through a second tap hole) or in ladle 42. As soon as tapping is complete, the electrodes are adjusted and power is turned on.

The process of the invention is primarily intended for converting finely divided materials such as swarf, turnings and the like into heavy melting stock, but those skilled in the art will appreciate that by removal of the unmelted charge and its reducing slag, and the replacement thereof with a refining slag, it is entirely possible to finish a heat to specification grade steel with conventional refining techniques. Naturally, this will only be economic on relatively large-scale installations.

The following specific examples of the invention in operation are intended to be illustrative only and should not be intrepreted in a limiting sense.

EXAMPLE I

Approximately 800 tons of stainless steel swarf were processed in a 1000 kva. furnace having a 4½ foot diameter hearth, in a campaign of 82 heats.

Samples of the swarf were analyzed and, as expected, the material was far from uniform. Chromium content ranged from 12.6 to 17.1%, iron ranged from 63.7 to 71.2%, and so forth. The gangue content averaged about 1% $SiO_2$ and 3% $Al_2O_3$, but varied considerably.

Some heavy scrap was melted initially to provide a molten pool. When this was established, a thin slag cover was formed thereover and the electrodes were positioned so that the tips just penetrated the slag. Charging was then commenced, and the charge mixtures used are set forth in Table I. This mixture was not used for the entire campaign but was deemed satisfactory.

*Table I.—Charge mixture*

| | Lbs. per 1000 lbs. grindings |
|---|---|
| Coal | 84.4 |
| Lime | 73.0 |
| Quartz | 35.1 |

It was generally possible to tap four heats per 8-hr. shift. Electrode voltage was 140 volts, and power consumption was about 750–775 kwh. per tone of metal produced when the operation was running smoothly. Further reduction in power consumption would result from continuous operation; in this campaign the furnace was operated only one shift per day.

The metal yield can be close to 95% once a good slag is established; in this test most heats yielded better than 90% of available metal. Yield is of course limited by the gangue content. The slag composition of a typical heat is set forth in Table II.

Table II.—Slag composition

| | Wt. percent |
|---|---|
| Cr | 3.05 |
| Fe | 1.26 |
| SiO$_2$ | 29.45 |
| Al$_2$O$_3$ | 17.03 |
| CaO | 41.60 |
| MgO | 2.43 |

The slag-to-metal ratio was in the range of 0.15–0.21 but, as noted above, a ratio of about 0.1 is possible if the raw material does not contain alumina. To avoid foaming, and the decrease in furnace capacity which it causes, sufficient fluxes (CaO, SiO$_2$) should be added to maintain the Al$_2$O$_3$ content of the slag below 20%.

To give a more complete picture of operation in accordance with the invention, data summarizing one shift of operation is shown in Table III.

Table III.—Operating data, 1,000 kw. furnace, intermittent operation

| | |
|---|---|
| Charge, lbs.: | |
| Grindings | 17,400 |
| Coal | 1,481 |
| Lime | 1,267 |
| Quartz | 611 |
| Production, lbs.: | |
| Metal | 15,860 |
| Slag | 2,760 |
| Kwh. | 5,856 |
| Volts | 140 |
| Kwh. per ton | 738 |
| Operating time, hrs. | 6.65 |
| Slag-to-metal ratio | 0.174 |

EXAMPLE II

Data for the same furnace as described in Example I, but operating continuously, 24 hours a day, is shown in Table IV.

Table IV.—Operating data for continuous operation in 1,000 kw. furnace

| | |
|---|---|
| Daily charge, lbs.: | |
| Grindings | 65,400 |
| Coal | 5,440 |
| Lime | 700 |
| Quartz | 2,300 |
| Production, lbs.: | |
| Metal | 58,900 |
| Slag | 10,890 |
| Kwh. | 18,810 |
| Volts | 140 |
| Kwh./ton | 640 |
| Operating time, hrs. | 21.5 |
| Slag-to-metal ratio | 0.184 |

The relationship between power loading and charge rate, necessary for smooth operation with maximum output, is shown in Table V.

Table V.—Feed rate vs. power loading for continuous operation in 1,000 kw. furnace

| Power loading: | Lbs. grindings per operating hr. |
|---|---|
| 600 | 1,690 |
| 700 | 2,190 |
| 800 | 2,650 |
| 900 | 3,130 |
| 1,000 | 3,640 |
| 1,100 | 4,100 |

EXAMPLE III

A second, larger furnace was available for melting using the improved process of the invention. This furnace has an inside hearth diameter of 11 feet and a transformer capacity of 5,000 kw. Data for continuous operation in this furnace are given in Table VI. The decrease in power consumption per ton of metal with the larger operation is most significant.

Table VI.—Operating data for continuous operation in 5,000 kw. furnace

| | |
|---|---|
| Charge, tons: | |
| Grindings | 224.1 |
| Coal | 18.9 |
| Lime | 16.0 |
| Quartz | 7.9 |
| Production, tons: | |
| Metal | 202.00 |
| Slag | 36.40 |
| Kwh. | 19,000 |
| Volts | 140–160 |
| Kwh./ton | 590 |
| Operating time, hrs. | 22.7 |
| Slag-to-metal ratio | 0.180 |

The utility of the invention is illustrated by the fact that the raw material has no real market value, while the product metal is quality melting stock and has a value of $225 per ton.

Various changes in the details, steps, materials and arrangements of parts, which have been herein described and illustrated in order to explain the nature of the invention, may be made by those skilled in the art within the principle and scope of the invention as defined in the appended claims.

What is claimed is:

1. The method of melting finely divided free-flowing metallic materials comprising:

continuously charging said metallics onto a molten slag bath maintained in an electric arc furnace, said charging being controlled so as to maintain the immediate vicinity of the electrodes free of said metallics, and the rate of said charging being controlled to maintain a layer of unmelted metallics on said slag;

maintaining said electrodes at about the surface of said slag bath, whereby any substantial arcing is avoided; and passing current through said electrodes and said bath, to heat said bath and melt metallics in contact with said bath, said metallics passing through said bath and forming a molten pool thereunder.

2. The method of claim 1, and additionally comprising periodically tapping said furnace.

3. The method of claim 1, wherein said charging is carried out at a plurality of points around the periphery of said furnace.

4. The method of claim 1, and additionally comprising charging minor proportions of flux and carbonaceous material with said metallics.

5. The method of claim 1, wherein the slag-to-metal weight ratio is at least about 0.1.

6. The method of claim 1, and additionally comprising refining said molten pool under a second, refining slag.

7. The method of melting finely divided, free-flowing metallics comprising:

continuously charging a mixture of said metallics and minor proportions of a carbonaceous reductant and flux onto a molten slag bath maintained in an electric arc furnace, said mixture being placed evenly around the periphery of said furnace out of contact with the electrodes, and a constant quantity of unmelted metallics being maintained on said slag;

heating said slag bath with said electrodes by slag resistance heating, whereby any substantial arcing is avoided, said heating melting metallics in contact with said slag bath, molten metal passing through said slag bath and forming a molten pool thereunder; and periodically tapping molten metal from said furnace.

8. The method of claim 7, wherein said flux is a mixture of lime and quartz, and said reductant is coal.

9. The method of claim 7, and additionally comprising tapping said slag and refining said metal under a second, refining slag prior to tapping said metal.

10. The method of claim 8, wherein said metallics contain a minor proportion of alumina, and sufficient flux is added to maintain the alumina content of said slag below about 20%.

References Cited

UNITED STATES PATENTS

| | | | |
|---|---|---|---|
| 1,902,638 | 3/1933 | Gustafsson | 75—12 |
| 1,686,207 | 10/1928 | Gustafsson. | |
| 1,751,083 | 3/1930 | Gustafsson. | |
| 1,857,779 | 5/1932 | Flodin et al. | |
| 1,901,367 | 3/1933 | Gustafsson. | |

FOREIGN PATENTS 745,001  2/1956  Great Britain.

DAVID L. RECK, *Primary Examiner.*

H. F. SAITO, W. W. STALLARD, *Assistant Examiners.*

UNITED STATES PATENT OFFICE
CERTIFICATE OF CORRECTION

Patent No. 3,385,494                        May 28, 1968

Nickolas J. Themelis et al.

It is certified that error appears in the above identified patent and that said Letters Patent are hereby corrected as shown below:

Column 4, line 66, "tone" should read -- ton --. Column 5, line 45, "700" should read -- 4700 --.

Signed and sealed this 9th day of December 1969.

(SEAL)
Attest:

Edward M. Fletcher, Jr.                        WILLIAM E. SCHUYLER, JR.
Attesting Officer                               Commissioner of Patents